(12) United States Patent
Sheridan

(10) Patent No.: US 9,765,875 B2
(45) Date of Patent: Sep. 19, 2017

(54) LUBRICATION SYSTEMS FOR GEARBOX ASSEMBLIES

(71) Applicant: Sikorsky Aircraft Corporation, Stratford, CT (US)

(72) Inventor: William G. Sheridan, Southington, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 15/157,066

(22) Filed: May 17, 2016

(65) Prior Publication Data

US 2016/0369887 A1  Dec. 22, 2016

Related U.S. Application Data

(60) Provisional application No. 62/182,109, filed on Jun. 19, 2015.

(51) Int. Cl.
    *F01D 25/18*   (2006.01)
    *F16H 57/04*   (2010.01)
    *B64C 27/14*   (2006.01)

(52) U.S. Cl.
    CPC ......... *F16H 57/0482* (2013.01); *B64C 27/14* (2013.01); *F16H 57/0404* (2013.01); *F16H 57/045* (2013.01); *F16H 57/0421* (2013.01); *F16H 57/0441* (2013.01)

(58) Field of Classification Search
    None
    See application file for complete search history.

(56) References Cited

U.S. PATENT DOCUMENTS

| 4,683,985 A * | 8/1987 | Hultgren ............ F16H 57/0421 |
| | | 184/11.2 |
| 5,174,719 A | 12/1992 | Walsh et al. |
| 5,411,116 A * | 5/1995 | Kish ...................... B64C 27/12 |
| | | 184/11.2 |
| 8,307,626 B2 | 11/2012 | Sheridan |
| 8,381,878 B2 * | 2/2013 | DiBenedetto ........... F01D 25/18 |
| | | 184/6.11 |
| 8,602,166 B2 | 12/2013 | Mullen et al. |
| 8,727,628 B2 | 5/2014 | Glahn et al. |
| 9,599,212 B2 * | 3/2017 | Poster ..................... B64C 13/42 |
| 2012/0247874 A1 | 10/2012 | Poster et al. |

FOREIGN PATENT DOCUMENTS

| GB | EP 0068677 A1 * | 1/1983 | ............ B64C 27/14 |
| JP | 2002005271 A * | 1/2002 | ......... F16H 57/0421 |

* cited by examiner

*Primary Examiner* — Dirk Wright
(74) *Attorney, Agent, or Firm* — Locke Lord LLP; Scott D. Wofsy; Christopher J. Cillié

(57) ABSTRACT

A gearbox assembly includes a housing with a housing interior. A sump is disposed within a lower region of the gearbox housing. A lubricated transmission element is arranged in the housing interior above the sump. A lubricant impoundment is arranged within the housing and in series between the transmission element and the sump such that lubricant flowing in a primary lubricant flow path between the transmission element and the sump is impounded in the lubricant impoundment, thereby providing a supply of lubricant for a secondary lubricant flow path disposed within the gearbox housing.

15 Claims, 5 Drawing Sheets

LUBRICATION SYSTEMS FOR GEARBOX ASSEMBLIES

CROSS-REFERENCE TO RELATED APPLICATION

This application claims the benefit of priority under 35 U.S.C. §119(e) to U.S. Provisional Application No. 62/182, 109, filed Jun. 19, 2015, which is incorporated herein by reference in its entirety.

BACKGROUND OF THE INVENTION

1. Field of the Invention

The present disclosure relates to transmissions, and more particularly to lubrication systems for mechanical power transmissions.

2. Description of Related Art

Rotorcraft transmissions commonly include transmission elements like gears and bearings that transmit rotational power through the transmission. Because these elements can be subject to heating and wear from friction while transmitting rotational power, rotorcraft transmissions typically include lubrication systems for supplying lubricant to the transmission components. Such lubrication systems generally irrigate the transmission components with a continuous flow of lubricant. This allows the transmission to transmit mechanical power while limiting heat and wear from friction between transmission components.

In some rotorcraft transmissions, operation under reduced lubricant flow conditions can accelerate transmission component wear. Aircraft certification bodies like the Federal Aviation Administration (FAA) therefore generally require that rotorcraft transmissions be able to operate for a minimum period of time with reduced lubricant flow—typically for at least thirty (30) minutes—under oil-out conditions. Transmissions may employ various elements to satisfy these requirements, such as additive injection, lubricant misting, glycol-based cooling, or supplemental lubrication circuits.

Such conventional lubrication methods and lubrication systems have generally been considered satisfactory for their intended purpose. However, there is still a need in the art for improved lubrication methods and lubrication systems. The present disclosure provides a solution for this need.

SUMMARY OF THE INVENTION

A gearbox assembly includes a gearbox with a gearbox interior. A sump is disposed within a lower region of the gearbox housing. A lubricated transmission element is arranged in the housing interior above the sump. A lubricant impoundment is arranged within the housing and in series between the transmission element and the sump such that lubricant flowing in a primary lubricant flow path between the transmission element and the sump is impounded in the lubricant impoundment, thereby providing a supply of lubricant for a secondary lubricant flow path disposed within the gearbox housing.

In certain embodiments, the secondary lubricant flow can include a secondary lubricant pump disposed within the gearbox housing. The secondary lubricant pump can be operably associated with the transmission element such that the transmission element powers the secondary lubricant pump while the transmission element is transmitting rotational energy. A lubricant conduit can be connected between the lubricant impoundment and the transmission element. It is contemplated that the lubricant conduit can be disposed within the gearbox housing.

In accordance with certain embodiments the lubricant impoundment can include an annular pan that is in fluid communication with a primary lubricant pump. The transmission element can be interposed between the primary lubricant pump and the annular pan, and a primary lubricant conduit external to the gearbox housing can be interposed between the primary lubricant pump and the annular pan. The transmission element can include a shaft defining a main rotor disk rotation axis of a rotorcraft or a planetary gear set of a rotorcraft transmission, and can extend through a center of the annular pan.

It is also contemplated that, in accordance with certain embodiments, the annular pan can include a radially inner wall extending about an inner periphery of the annular pan. The annular pan can include a radially outer wall extending about an outer periphery of the annular pan. The annular pan can include a metering lip coupled to the annular pan outer periphery. For example, the lubricant impoundment can include a metering lip disposed between the floor of the annular pan and the transmission element. The metering lip can limit lubricant flow through the gap between the annular pan and the sump, such as when the housing is angled relative to gravity and lubricant would otherwise slosh out of the annular pan and into the sump.

In an aspect, a transmission includes a gearbox assembly as described above. The lubricant impoundment is connected in series both between the transmission element and the sump in a primary lubricant flow path and between the transmission element in a secondary lubricant flow path. In certain embodiments, the secondary lubricant flow path can include a scavenge conduit, a secondary lubricant pump, and a secondary pressurized lubricant conduit connected between the lubricant impoundment and the transmission element. Each of the scavenge conduit, the secondary lubricant pump, and the secondary pressurized lubricant conduit can be disposed within the gearbox housing, and the scavenge conduit can connect to the lubricant impoundment at a radially outer portion of the lubricant impoundment. In accordance with certain embodiments, a sensor can be connected to the secondary lubricant flow path to measure lubricant flow through the secondary lubricant flow path and/or detect entrained debris in lubricant flowing through the secondary lubricant flow path.

In another aspect, a method of lubricating a gearbox assembly includes receiving lubricant in a lubricant impoundment disposed within an interior of a gearbox housing between a transmission element and a sump disposed within the interior of the gearbox housing, lubricating the transmission element with the lubricant from the impoundment using a primary lubricant flow path, and lubricating the transmission element with lubricant from the impoundment using a secondary lubricant flow path. In embodiments, the method can include lubricating the transmission element using lubricant from both primary and secondary lubricant flow paths. In embodiments the method can include lubricating the transmission element using lubricant from only the secondary lubricant flow path, such as during operation under oil-out conditions.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
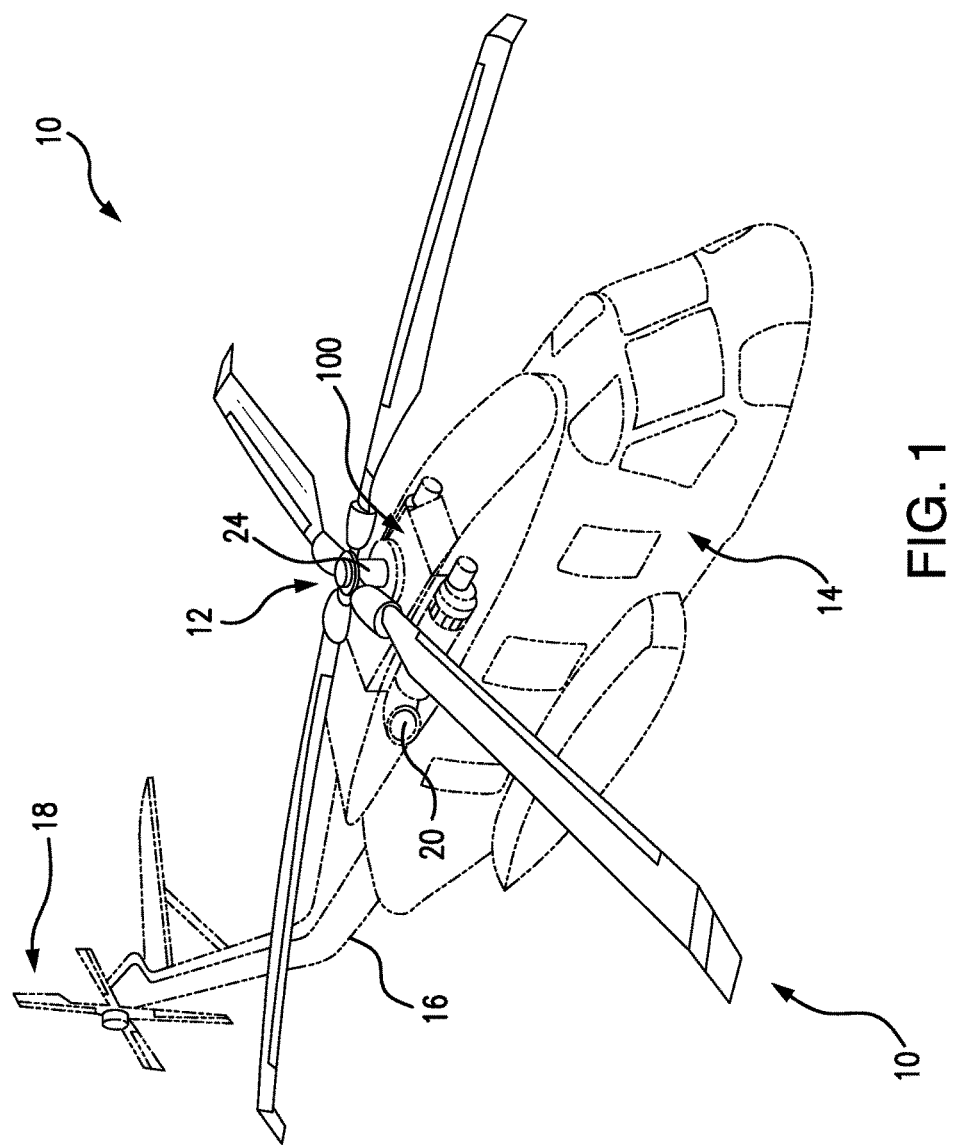
FIG. 1 is a perspective view of an exemplary embodiment of a rotorcraft constructed in accordance with the present disclosure, schematically showing a gearbox assembly.

Reference will now be made to the drawings wherein like reference numerals identify similar structural features or aspects of the subject disclosure. For purposes of explanation and illustration, and not limitation, a partial view of an exemplary embodiment of a gearbox assembly in accordance with the disclosure is shown in FIG. 1 and is designated generally by reference character 100. Other embodiments of gearbox assemblies, transmission systems, and methods of lubricating gearbox assemblies and transmission systems in accordance with the disclosure, or aspects thereof, are provided in FIGS. 2-5, as will be described. The systems and methods described herein can be used in vehicular applications, such as in aircraft.

Referring now to FIG. 1, an exemplary rotorcraft 10 is shown. Rotorcraft 10 includes a main rotor system 12 and an airframe 14. Airframe 14 includes a longitudinally extending tail 16 with a tail rotor system 18, at least one engine 20, and a gearbox assembly 100. Engine 20 is operatively connected to main rotor system 12 and tail rotor system 18 through gearbox assembly 100, and is configured to supply rotational energy to both main rotor system 12 through a main rotor shaft 24 and tail rotor system 18 through gearbox assembly 100. Although a particular rotorcraft configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
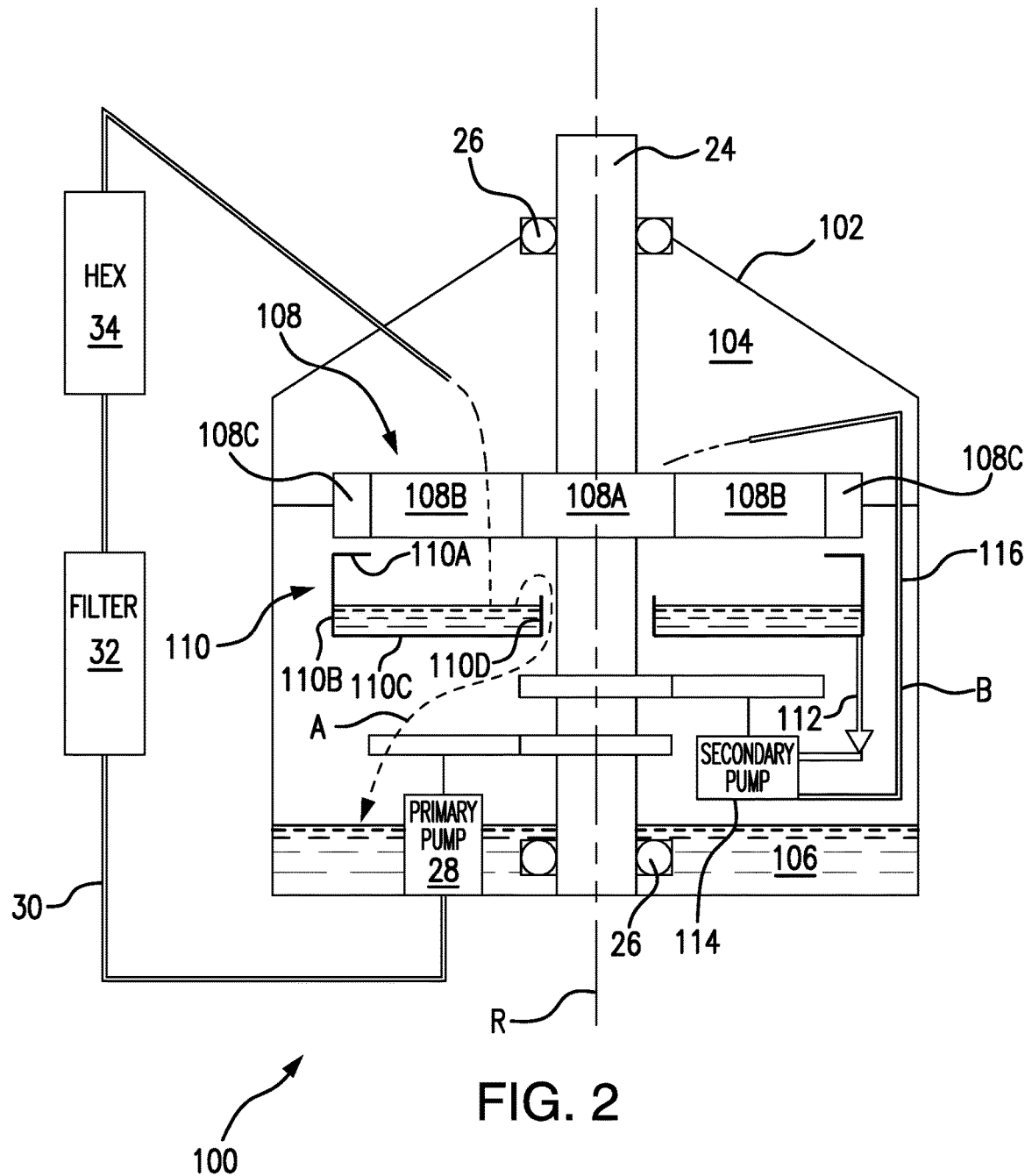
FIG. 2 is a cross-sectional side elevation view of the gearbox assembly of FIG. 1, schematically showing a lubricant impoundment disposed within the gearbox housing.

With reference to FIG. 2, gearbox assembly 100 is shown. Gearbox assembly 100 includes a housing 102 with an interior 104. A lubricant sump 106 is disposed within a lower region of housing 102 relative to gravity when rotorcraft 10 (shown in FIG. 1) is in level flight, and a lubricated transmission element 108 is arranged within interior 104 above sump 106. A lubricant impoundment 110 is arranged within interior 104 in series between transmission element 108 and sump 106 such that lubricant flowing in a primary lubricant flow path A between transmission element 108 and sump 106 is impounded in lubricant impoundment 110, thereby providing a supply of lubricant for a secondary lubricant flow path B disposed within interior 104. In the illustrated exemplary embodiment, secondary lubricant flow path B is housed completely within gearbox assembly 100.

Main rotor shaft 24 is supported for rotation relative to gearbox assembly 100 by bearing systems 26. As illustrated in FIG. 2, transmission element 108 includes a planetary gear set with a sun gear 108A, planetary gears 108B, and a ring gear 108C. Sun gear 108A is fixed to main rotor shaft 24 for common rotation with main rotor shaft 24 and main rotor system 12 (shown in FIG. 1). Sun gear 108A intermeshes with a plurality of planetary gears 108B. Planetary gears 108B intermesh with ring gear 108C, which in turn may be fixed relative to housing 102.

Primary lubricant flow path A includes lubricant impoundment 110, sump 106, and a primary lubricant pump 28. Primary lubricant flow path A also includes a primary lubricant supply conduit 30 and transmission element 108. Primary lubricant pump 28 may be disposed within interior 104, is operably associated with main rotor shaft 24, and is in fluid communication with both sump 106 and primary lubricant supply conduit 30. Primary lubricant supply conduit 30 extends through the wall of housing 102 and is in fluid communication with transmission element 108 for irrigating transmission element 108 with lubricant drawn by primary lubricant pump 28 from sump 106. Lubricant provided by primary lubricant supply conduit 30 to transmission element 108 traverses transmission element 108, flows to lubricant impoundment 110, and is thereafter retained therein for a predetermined residence interval. Once the retention interval tolls the lubricant returns may to sump 106 for recirculation transmission element 108 through primary lubricant flow path A, or may recirculate to transmission element 108 through secondary lubricant flow path B.

As shown, primary lubricant pump 28 and secondary lubricant pump 114 are mechanically driven by rotation of main rotor shaft 24. Specifically, primary lubricant pump 28 is driven by main rotor shaft 24 so as to pump lubricant through primary lubricant flow path A, and second lubricant pump 128 is driven by main rotor shaft 24 to pump lubricant through secondary lubricant flow path B. As such, both primary lubricant pump 28 and secondary lubricant pump 114 are always operating to pump lubricant in the illustrated embodiment. However, it is to be understood that other mechanical mechanisms can be used to provide power to primary lubricant pump 28 and secondary lubricant pump 114 to enable pumping of lubricant through primary flow path A and secondary lubricant flow path B.

Primary lubricant supply conduit 30 may also include one or more primary lubricant system elements, such as a lubricant filter 32 and/or a lubricant heat exchanger 34 by way of non-limiting example. It is also contemplated that primary lubricant supply conduit 30 can be disposed internally within housing 102, such as through a cored passage, as well as externally of housing 102.

Secondary lubricant flow path B includes lubricant impoundment 110, a scavenge conduit 112, a secondary lubricant pump 114, a secondary lubricant supply conduit 116, and transmission element 108. Scavenge conduit 112 is connected between lubricant impoundment 110 and secondary lubricant pump 114, is disposed within housing 102 (or interior 104), and places lubricant impoundment 110 in fluid communication with secondary lubricant pump 114. Secondary lubricant supply conduit 116 is connected between secondary lubricant pump 114 and transmission element 108, and is configured to supply lubricant to transmission element 108 from lubricant impoundment 110. Secondary lubricant pump 114 is disposed within gearbox interior 104 and is operatively associated with main rotor shaft 24 such that rotation of main rotor system 12 (shown in FIG. 1) powers secondary lubricant pump 114. While shown with the primary lubricant system elements in primary lubricant supply conduit 30, it is to be understood that the primary lubricant system elements need not exist in all aspects of the invention for primary lubricant supply conduit 30, and/or one or more elements can be included in secondary lubricant supply conduit 116 in addition to or instead of primary lubricant supply conduit 30.

Lubricant impoundment 110 includes an annular pan defining a central aperture. The annular pan includes a metering lip 110A, a radially outer wall 110B, a pan floor 110C, and a radially inner wall 110D. Metering lip 110A connects at its radially outer end to radially outer wall 110B. Radially outer wall 110B extends vertically between metering lip 110A and pan floor 110C. Pan floor 110C extends between radially outer wall 110B and radially inner wall 110D. Radially inner wall 110D extends upwards from pan floor 110C, extends circumferentially about main rotor shaft 24, and defines therebetween a gap through which lubricant from lubricant impoundment 110 issues from lubricant impoundment 110 to sump 106. It is contemplated that radially inner wall 110D can have a height (from pan floor 110C) that is smaller than a height of radially outer wall 110B. This height difference causes the rate of lubricant issue from lubricant impoundment 110 into sump 106 to be governed by the gap width except at relatively extreme attitudes of gearbox assembly 100—at which point the radial length of metering lip 110A restricts slosh from lubricant impoundment 110, thereby maintaining a supply of secondary lubricant within lubricant impoundment 110 irrespective of the attitude of the aircraft mounting gearbox assembly 100.

Figure 3:
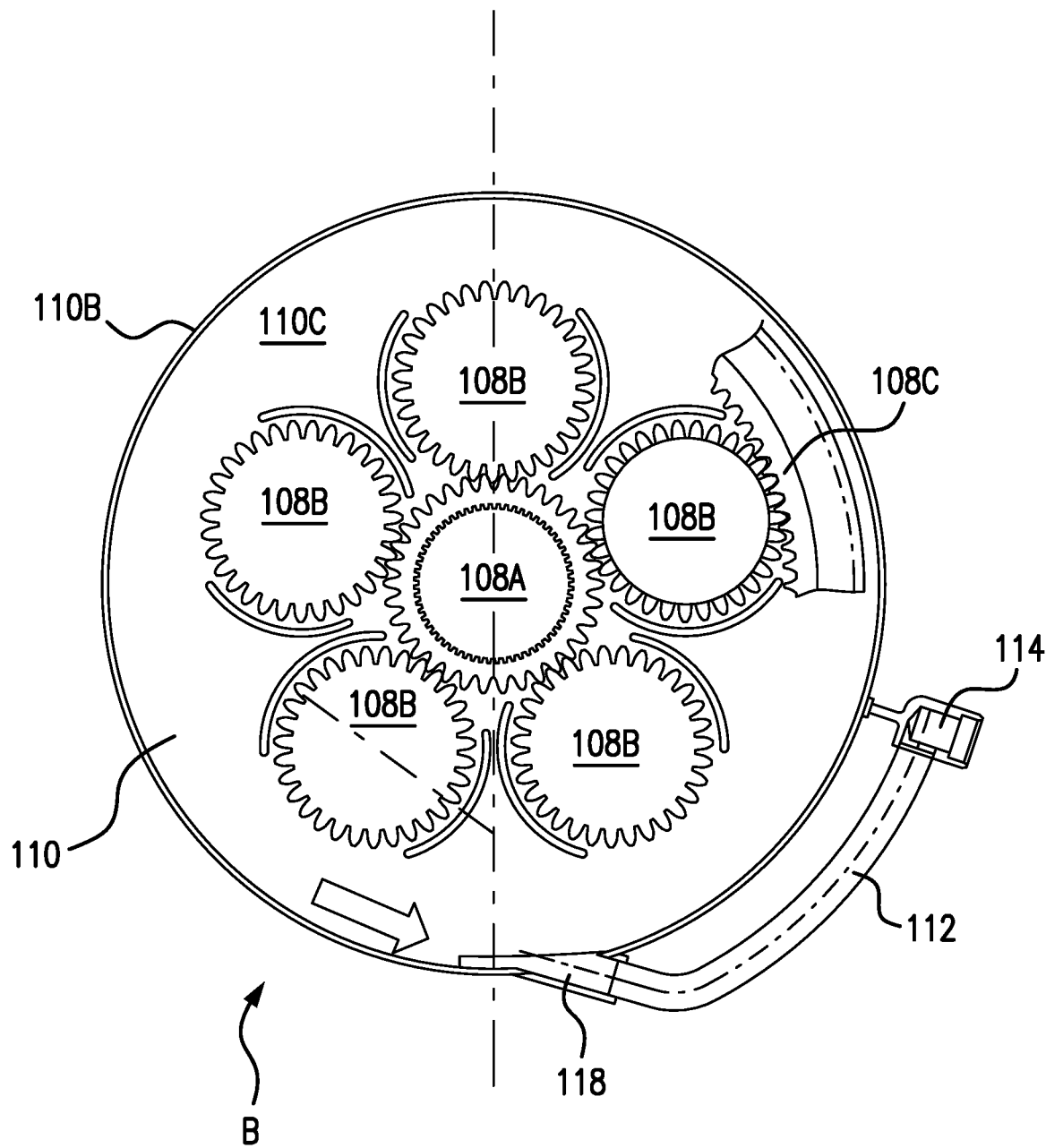
FIG. 3 is a plan view of lubricant impoundment of FIG. 2, showing a scavenge conduit coupled between the lubricant impoundment and secondary lubricant pump at a radially outer portion of the lubricant impoundment.

With reference to FIG. 3, transmission element 108 and lubricant impoundment 110 are shown. Scavenge conduit 112 connects to a radially outer portion lubricant impoundment 110 through scoop structure 118. Scoop structure 118 is fixed to lubricant impoundment 110 at radially outer wall 110B. Scavenge conduit 112 extends in a counterclockwise direction relative to rotation axis R, about lubricant impoundment 110 and generally in the direction of rotation of sun gear 108A and main rotor system 12 (shown in FIG. 1), thereby cooperating with gear windage to force lubricant into scoop structure 118 and reduce the size of secondary lubricant pump 114 for a given lubricant flow requirement.

Coupling scavenge conduit 112 at a radially outer portion of lubricant impoundment 110 can improve the ability of secondary lubricant pump 114 to draw lubricant traversing transmission element 108 from lubricant impoundment 110. This potentially reduces the size of lubricant impoundment 110 and/or secondary lubricant pump 114 necessary to provide lubricant during operation with reduced lubricant flow from primary lubricant flow path A (shown in FIG. 2). As will be appreciated, since both lubricant impoundment 110 and secondary lubricant pump 114 are disposed within interior 104, reducing the size of the either or both can enable the components to be added to existing transmission systems without increasing the size of the gearbox housing.

Figure 4:
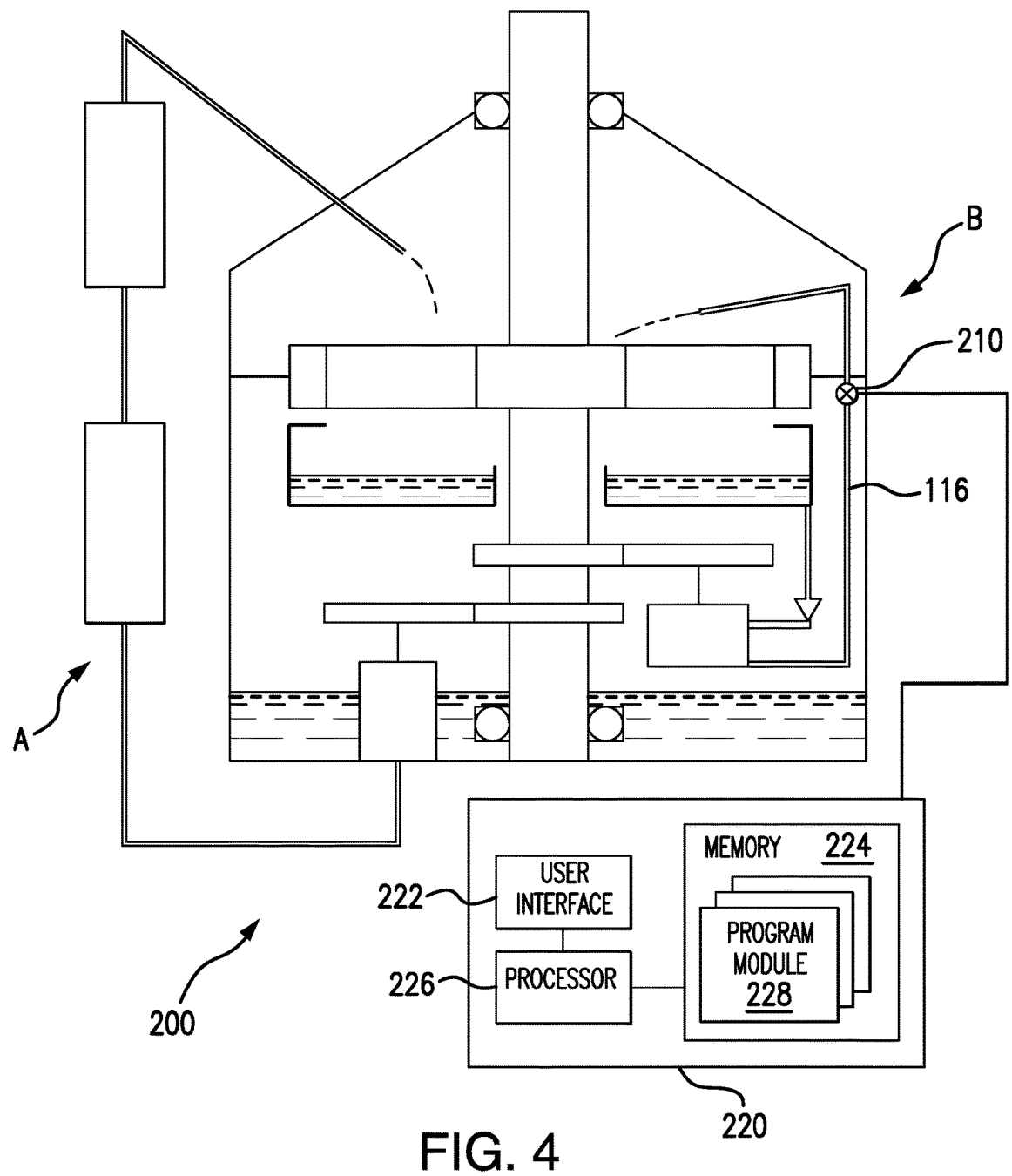
FIG. 4 is a cross-sectional side elevation view of another embodiment of the gearbox assembly of FIG. 1, schematically showing a sensor coupled to a lubricant scavenge conduit.

With reference to FIG. 4, a gearbox assembly 200 is shown. Gearbox assembly 200 is similar to gearbox assembly 100, and additionally includes a sensor 210 connected to secondary lubricant supply conduit 116. Sensor 210 may include a pressure measurement device and/or an in-line debris detector, and is communicative with a controller 220. Controller 220 is communicative with a user interface 222 and a memory 224. Memory 224 has one or more program modules 228 recorded thereon containing instructions, that when read by a processor 226 disposed within controller 220, cause controller 220 to (a) determine whether sufficient lubricant pressure is being provided by secondary lubricant pump 114, and (b) alert the aircraft crew or remote monitoring status as to the availability of lubricant from secondary lubricant flow path B. In this respect, the 'always on' arrangement secondary lubricant pump 114 allows continuing monitoring of the availability of backup lubrication in the event or reduced lubricant flow from primary lubricant flow path A, such as during an oil-out event.

Figure 5:
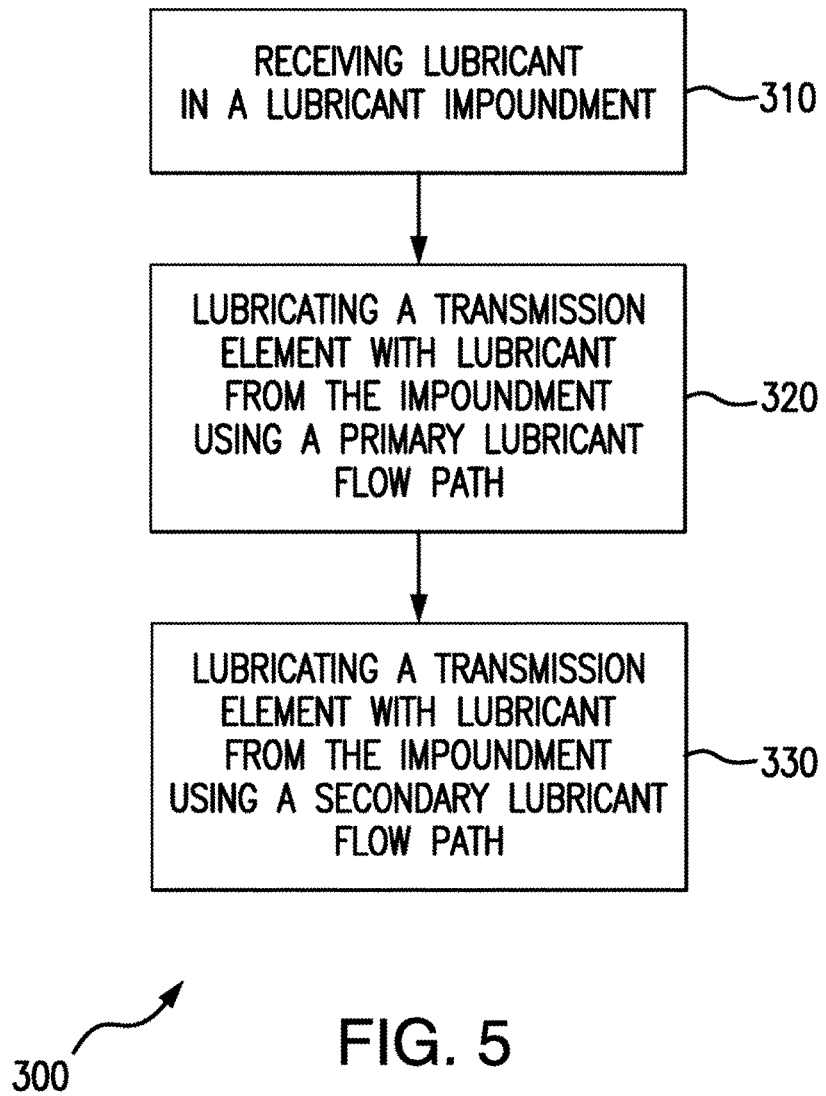
FIG. 5 is diagram of a method of lubricating a gearbox assembly.

With reference to FIG. 5, a method 300 of lubricating a transmission is shown. Method 300 includes receiving lubricant in a lubricant impoundment, e.g. lubricant impoundment 108, disposed within an interior of a gearbox housing between a transmission element and a sump that are also disposed within the interior of the gearbox housing, as shown with box 310. Method 300 also includes lubricating the transmission element with the lubricant from the impoundment using a primary lubricant flow path, as shown with box 320, and lubricating the transmission element with lubricant from the impoundment using a secondary lubricant flow path, as shown with box 330. Lubricating the transmission element may include lubricating the transmission element using lubricant from both primary and secondary lubricant flow paths. Alternatively, lubricating the transmission element may include lubricating the transmission element using lubricant from only the secondary lubricant flow path.

Some gearbox assemblies can leak lubricant from cracks that develop in the gearbox housing, holes resulting from ballistic impact, or maintenance incidents such as failure to properly reinstall the gearbox drain plug and/or other lubrication system components. These can result in lubricant loss while the gearbox is transmitting rotational energy. Some leaks can be relatively slow, leakage requiring between about ten and sixty minutes before lubricant flow from the primary lubricant flow path may be reduced. Other losses can be relatively rapid, such as pressure side leaks, leakage requiring less than ten minutes before lubricant flow from the primary lubricant flow path may be reduced.

Embodiments of the gearbox assemblies, transmission systems, and lubrication methods described herein can provide a supply of lubricant sufficient for gearbox operation for more than thirty (30) minutes, and in certain embodiments, more than sixty (60) minutes of operation, extending the interval of time between when the primary lubrication flow path may no longer be able to provide sufficient lubricant flow to when operation of the gearbox assembly may be affected, thereby providing compliance with the certification requirements described above irrespective of how fast lubricant is lost from the gearbox assembly.

In certain embodiments described herein, gearbox assemblies, transmissions, and lubrication methods use a sheet metal or thin walled annular pan disposed below the gearbox drive gears to impound lubricant from the gearbox main drive gears. Gear windage swirls the lubricant to the outer edges of the annular pan forming the lubricant impoundment such that centrifugal force urges the lubricant received from transmission element into the scavenge conduit that in turn leads to secondary lubricant pump. Inner and outer radial walls extend about the inner and outer edges of the annular pan impound (or trap) the lubricant within the annular pan both when the drive gears are turning as well as when drive gears are static. Lubricant is permitted to spill over the radial walls by a metering lip coupled to the outer wall, thereby providing a predetermine volume of impounded lubricant available to the secondary lubricant flow path in the event of reduced lubricant flow from the primary lubricant flow path and providing a continuous flow of lubricant to the primary lubricant flow path.

The secondary lubricant flow path may further include a mechanical secondary lubricant pump that pumps lubricant whenever the main rotor system of a rotorcraft is turning. The secondary lubricant pump receives lubricant from the lubricant impoundment, which centrifugally sends captured lubricant to the secondary lubricant pump aided by the windage of the transmission elements driving connected to the main rotor system. This enables the secondary lubricant flow path capture, circulate, re-capture, and re-circulate lubricant sufficient to lubricate the main drive gears for more than thirty (30) minutes, and in certain embodiments, more than sixty (60) minutes solely through operation of components disposed with the rotorcraft transmission main gearbox housing.

The methods and systems of the present disclosure, as described above and shown in the drawings, provide for transmissions with superior properties including improved reliability during operation in an oil-out condition. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gearbox assembly, comprising:
   a housing with an interior and a sump which holds lubricant;
   a transmission element disposed within the interior and above the sump which receives and is lubricated by the lubricant; and
   a lubricant impoundment disposed between the transmission element and the sump,
   wherein the lubricant impoundment is connected in series between the transmission element and the sump in a primary lubricant flow path through which the lubricant held in the sump reaches the transmission element, and
   wherein the lubricant impoundment maintains a supply of lubricant having passed through the transmission element for a secondary lubricant flow path other than the primary lubricant flow path and disposed within the gearbox housing through which the lubricant held in the lubricant impoundment reaches the transmission element.

2. The gearbox assembly as recited in claim 1, wherein the secondary lubricant flow path includes a secondary lubricant pump disposed within the housing which pumps the lubricant held in the lubricant impoundment to the transmission element via the secondary lubricant flow path.

3. The gearbox assembly as recited in claim 1, further including a secondary lubricant pump operably associated with the transmission element.

4. The gearbox assembly as recited in claim 1, wherein the primary lubricant flow path includes a primary lubricant pump disposed within the housing that pumps the lubricant held in the sump to the transmission element via the primary lubricant flow path.

5. The gearbox assembly as recited in claim 1, further including a primary lubricant pump operably associated with the transmission element.

6. The gearbox assembly as recited in claim 1, wherein secondary lubricant flow path includes a lubricant conduit disposed within the housing connecting the lubricant impoundment with the transmission element.

7. The gearbox assembly as recited in claim 1, wherein the lubricant impoundment is in fluid communication with comprises an annular pan in fluid communication with both a primary lubricant pump which pumps the lubricant held in the sump to the transmission element through the primary lubricant flow path.

8. The gearbox assembly as recited in claim 1, further including a shaft coupled to the transmission element and extending through the lubricant impoundment.

9. The gearbox assembly as recited in claim 1, wherein the lubricant impoundment comprises an annular pan with a radially inner wall extending about an inner periphery of the annular pan, a radially outer wall extending about an outer periphery of the annular pan, and a metering lip extending radially inward from the outer wall.

10. The gearbox assembly as recited in claim 1, wherein the transmission element comprises a planetary gear arrangement.

11. The gearbox assembly as recited in claim 1, wherein the secondary lubricant flow path comprises a scavenge conduit, a secondary lubricant pump, and a secondary pressurized lubricant conduit connected between the lubricant impoundment and the transmission element,
   wherein the scavenge conduit, the secondary lubricant pump, and the secondary pressurized lubricant conduit are disposed within the gearbox housing, and
   wherein the scavenge conduit connects to the lubricant impoundment at a radially outer portion of the lubricant impoundment.

12. The gearbox assembly as recited in claim 1, wherein the primary lubricant flow path comprises a primary lubricant pump and a primary pressurized lubricant conduit connected between the sump and the transmission element,
   wherein at least one of the primary lubricant pump and primary pressurized lubricant conduit are external of the housing.

13. The gearbox assembly as recited in claim 1, further including a sensor connected to the secondary lubricant flow path, wherein the sensor is configured to at least one of (a) measure lubricant flow through the secondary lubricant flow path, and (b) detect entrained debris in lubricant flowing through the secondary lubricant flow path.

14. A transmission assembly for an aircraft including a gearbox assembly as recited in claim 1.

15. A method of lubricating a gearbox assembly, comprising:
   receiving lubricant in a lubricant impoundment disposed within an interior of a gearbox housing between a transmission element and a sump disposed within the interior of the gearbox housing;
   lubricating the transmission element with lubricant from the impoundment using a primary lubricant flow path; and
   lubricating the transmission element with lubricant from the impoundment using a secondary lubricant flow path.

* * * * *